(12) United States Patent
Danner

(10) Patent No.: US 6,709,582 B2
(45) Date of Patent: Mar. 23, 2004

(54) COMBINED FILTER AND SKIMMER ASSEMBLY FOR PONDS

(76) Inventor: Michael Danner, 21 N. Road, Stony Brook, NY (US) 11790

( * ) Notice: Subject to any disclaimer, the term of this patent is extended or adjusted under 35 U.S.C. 154(b) by 16 days.

(21) Appl. No.: 10/128,625

(22) Filed: Apr. 22, 2002

(65) Prior Publication Data

US 2003/0196941 A1 Oct. 23, 2003

(51) Int. Cl.[7] .................................................. E02B 3/04
(52) U.S. Cl. ...................... 210/170; 210/238; 210/242.1
(58) Field of Search ................................. 210/169, 170, 210/232, 238, 242.1, 242.2, 242.3, 242.4

(56) References Cited

U.S. PATENT DOCUMENTS

| | | | | |
|---|---|---|---|---|
| 444,500 | A | * 1/1891 | Meyer ........................ 99/536 |
| 687,423 | A | * 11/1901 | DeWitt et al. ............... 210/124 |
| 717,932 | A | * 1/1903 | Scudder .................... 210/242.1 |
| 763,325 | A | * 6/1904 | Roche ...................... 210/242.1 |
| 1,647,809 | A | * 11/1927 | Neumann ................. 210/242.1 |
| 3,303,932 | A | * 2/1967 | Hirs et al. .................... 210/776 |
| 3,402,817 | A | * 9/1968 | Dovel .......................... 210/793 |
| 5,028,320 | A | * 7/1991 | Gaudin et al. ............... 210/164 |
| 5,133,854 | A | * 7/1992 | Horvath ....................... 210/121 |
| 5,143,605 | A | * 9/1992 | Masciarelli ................. 210/169 |
| 5,275,721 | A | * 1/1994 | Mathews .................... 210/169 |
| 5,814,213 | A | * 9/1998 | Glasgow ..................... 210/104 |
| 6,027,641 | A | * 2/2000 | Spradbury et al. .......... 210/169 |
| 6,274,047 | B1 | * 8/2001 | Bates et al. .................. 210/747 |
| 6,299,765 | B1 | * 10/2001 | Fabrizio ...................... 210/169 |
| 6,461,501 | B1 | * 10/2002 | Porter ......................... 210/167 |
| 2002/0179507 | A1 | * 12/2002 | Wolford et al. ............. 210/130 |

FOREIGN PATENT DOCUMENTS

DE                567646        * 10/1975

* cited by examiner

*Primary Examiner*—Fred G. Prince
(74) *Attorney, Agent, or Firm*—Galgano & Burke

(57) ABSTRACT

A combined filter and skimmer assembly for ponds includes a submersible filter box containing replaceable filter media, the filter box having a water inlet, a skimmer coupling coupled to an upstanding conduit coupled to a skimmer head, and a water outlet adapted to be coupled to an underwater pump. According to the presently preferred embodiment, the filter box is rectangular with a removable lid. The lid has a raised central portion wherein lies the water inlet. The water inlet is preferably adjustable as to the size of the inlet. The skimmer coupling is also located in the raised portion of the lid and is spaced apart from the water inlet. According to the presently preferred embodiment, the skimmer head preferably includes a floating cup which automatically adjusts to the level of the surface of the pond. Optionally the floating cup is free to tilt to adjust for an angular difference between the surface of the lid and the surface of the pond.

39 Claims, 5 Drawing Sheets

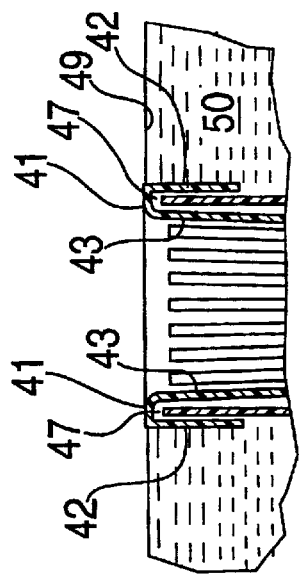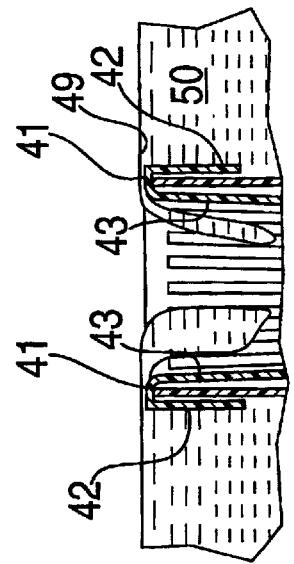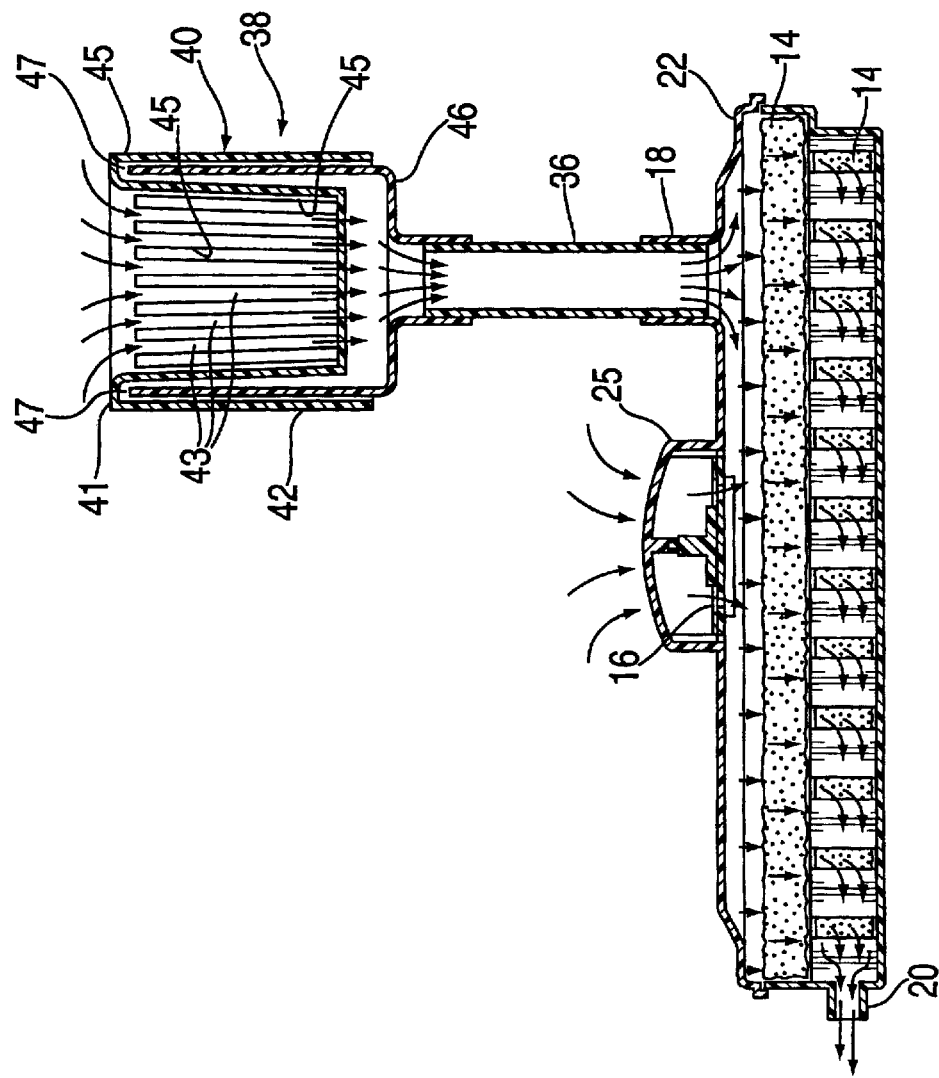

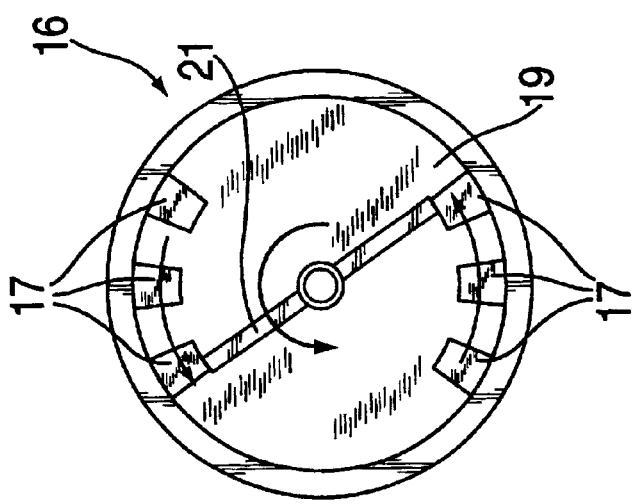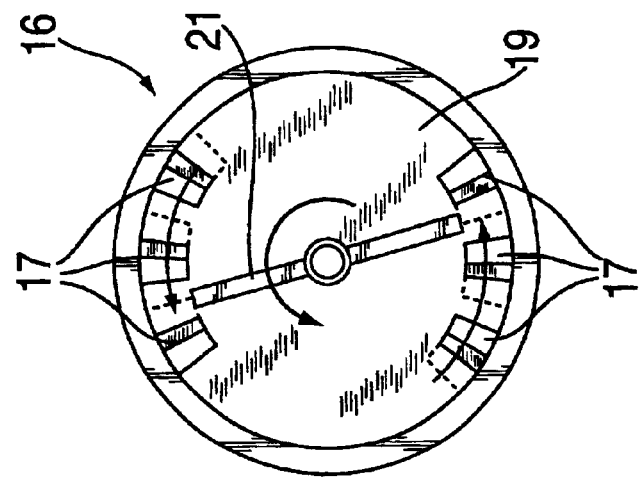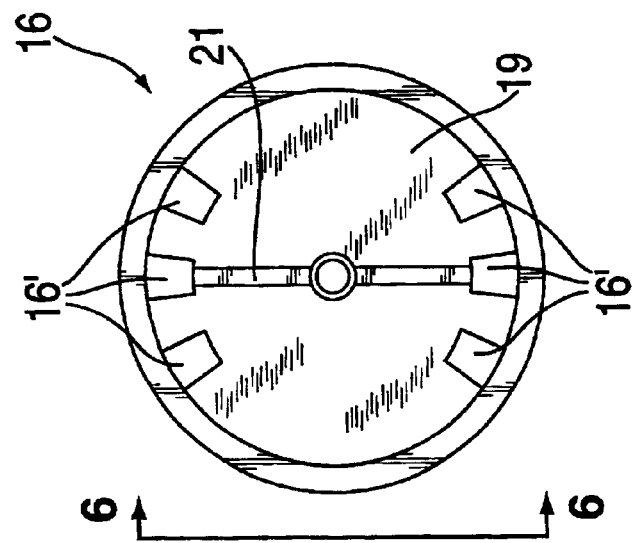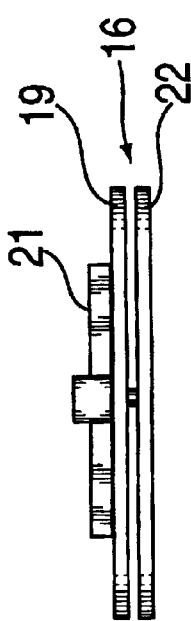

COMBINED FILTER AND SKIMMER ASSEMBLY FOR PONDS

BACKGROUND OF THE INVENTION

1. Field of the Invention

The invention relates to outdoor ponds. More particularly, the invention relates to an apparatus for filtering pond water and skimming the surface of the pond.

2. State of the Art

Ponds have always been a desirable landscaping feature, particularly in conjunction with gardens. Until recently, however, artificial ponds have been relatively expensive to construct. With the advent of fish-safe polymer liner material that can be formed into any convenient shape, and covered with rock strata, natural looking artificial ponds have become a popular landscape feature.

Both natural and artificial ponds require maintenance in order to remain aesthetically pleasing. Ponds should also provide a habitat not only for fish but other creatures such as birds, frogs, butterflies and the like. Clear water is the feature most desired in ponds so that fish and submerged plants may be viewable. However, maintaining the clarity of the water can be difficult. Algae, in particular free swimming algae, may cause the water to become cloudy. The excessive algae typically occurs when the water contains an excess of nutrients such as ammonia and phosphorous. This ammonia and phosphorous is generally added to pond water by fish waste and fertilizer runoff from the land surrounding the pond. Although aquatic plants may consume a portion of the nutrients, the number of plants is typically insufficient to handle the amount of excessive nutrients in a pond. Algae, which feed on these nutrients, then multiply due to the abundance of nutrients. This multiplication may result in algae "blooms" which cause the pond water to cloud.

One method of clarifying water is to add chemicals to the water which destroy algae. However, these chemicals may destroy or have a negative impact on the number and growth of aquatic plants and fish. Also, chemicals must be replenished and this can be expensive.

An additional maintenance problem involves the removal of leaves and other foliage which fall onto the surface of the pond. Unless it is soon removed from the surface, this foliage settles to the bottom where it decompose forming a layer of sludge. The sludge may reduce the depth of the pond and may also cover underwater formations. Removing the sludge requires draining the pond, a drastic procedure which requires temporary storage of fish and threatens the life of aquatic plants.

With these issues in mind, several companies have looked to the art of swimming pool maintenance in an effort to design apparatus for filtering pond water and skimming the pond surface. Typical solutions based on swimming pool technology are disclosed in U.S. Pat. Nos. 5,584,991 and 6,054,045 to Wittstock et al. One of the main disadvantages of these solutions is that they require excavation and permanent installation. In many cases, these solutions must be installed when the pond is first constructed because pipes need to be laid beneath the pond. In addition, these solutions require that relatively large apparatus be arranged adjacent to the pond. These unsightly apparatus must be camouflaged with stones, shrubs, etc.

The applicant herein has looked beyond swimming pool technology to provide the Pondmaster® filter system. The applicant's Pondmaster® filter system is fully submersible in an existing pond, does not require any excavation, and does not require unsightly apparatus to be located adjacent to the pond. It is modular and can be expanded to suit ponds of different sizes. However, the Pondmaster® system does not include a skimmer.

SUMMARY OF THE INVENTION

It is therefore an object of the invention to provide a combined filter and skimmer assembly for ponds.

It is also an object of the invention to provide a combined filter and skimmer assembly for ponds which is fully submersible in an existing pond.

It is another object of the invention to provide a combined filter and skimmer assembly for ponds which does not require any excavation to be installed.

It is still another object of the invention to provide a combined filter and skimmer assembly for ponds which does not require unsightly apparatus to be located adjacent to the pond.

It is yet another object of the invention to provide a combined filter and skimmer assembly for ponds which is modular and can be expanded to suit ponds of different sizes.

It is a further objection of the invention to provide a combined filter and skimmer assembly for ponds having a skimmer floating cup which is free to tilt to adjust for an angular difference between the water surface and the top surface of the floating cup.

It is still a further object of the present invention to provide a combined filter and skimmer assembly for a pond having a floating cup which automatically adjusts to the level of the surface of the pond.

In accord with these objects which will be discussed in detail below, the apparatus of the present invention includes a submersible filter box containing replaceable filter media, the filter box having a water inlet, a skimmer coupling, and a water outlet adapted to be coupled to an underwater pump. According to the presently preferred embodiment, the filter box is rectangular with a removable lid. The filter media is located in two sections of the box defined by two rows of baffles which are spaced apart to define a channel between the two sections. The water outlet is preferably aligned with the channel. The lid has a raised central portion wherein lies the water inlet. The water inlet is preferably adjustable as to the size of the inlet. The skimmer coupling is also located in the raised portion of the lid and is spaced apart from the water inlet. According to the presently preferred embodiment, the skimmer coupling is coupled to an upstanding conduit, the end of which is coupled to a skimmer head. The skimmer head preferably includes a floating cup which automatically adjusts to the level of the surface of the pond. Optionally the floating cup is free to tilt to adjust for an angular difference between the surface of the lid and the surface of the pond.

Additional objects and advantages of the invention will become apparent to those skilled in the art upon reference to the detailed description taken in conjunction with the provided figures.

BRIEF DESCRIPTION OF THE DRAWINGS

FIG. 4A is a side sectional view of the combined filter and skimmer apparatus showing the filter media and illustrating with arrows the flow of water through the apparatus;

FIG. 4B is an enlarged, fragmentarilly-illustrated side view showing the normal position of the floating cup relative to the pond water level;

FIG. 4C is an enlarged, fragmentarilly-illustrated side view showing the position of the floating cup upon operation of the pump;

FIGS. 5A–5C illustrate the adjustable water inlet; and

FIG. 6 is a view of the adjustable water inlet looking in the direction 6—6 of FIG. 5A.

DETAILED DESCRIPTION OF THE PREFERRED EMBODIMENTS

Figure 1:
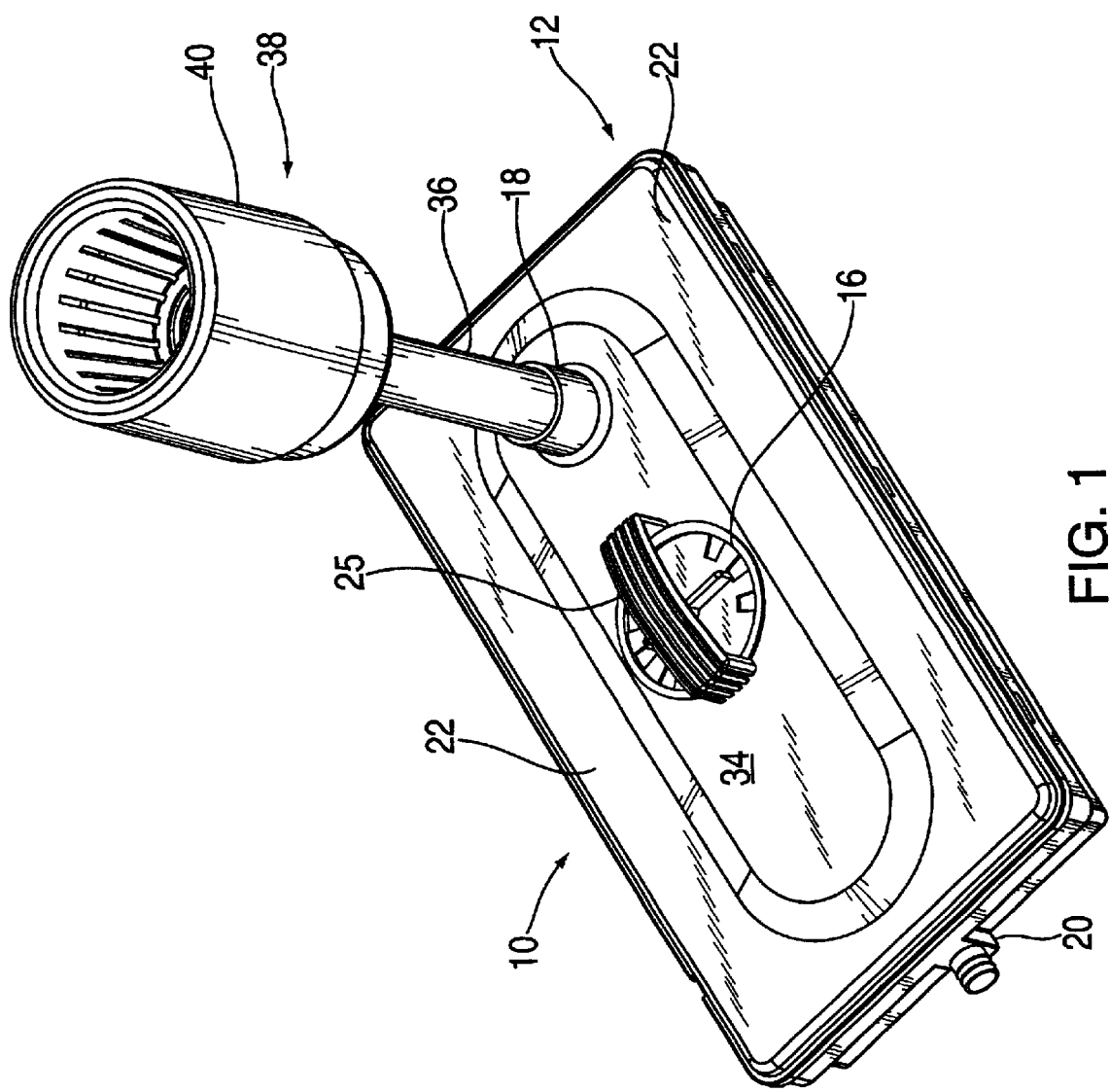
FIG. 1 is perspective view of a combined filter and skimmer apparatus according to the invention.

Referring now to the Figures. generally, the apparatus 10 of the present invention includes a submersible filter box 12 containing replaceable filter media 14 (FIG. 4). The filter box 12 has a water inlet 16, a skimmer coupling 18, and a water outlet 20. The water outlet 20 is adapted to be coupled to an underwater pump (not shown) which may, in turn, be coupled to a fountain (not shown).

According to the presently preferred embodiment, the filter box 12 is rectangular with a removable lid 22. More particularly, as seen best in FIG. 3, the lid 22 and the box 12 engage each other via a plurality of snap couplings 23 such that the lid 22 remains coupled to the box 12 until it is intentionally removed.

Figure 2:
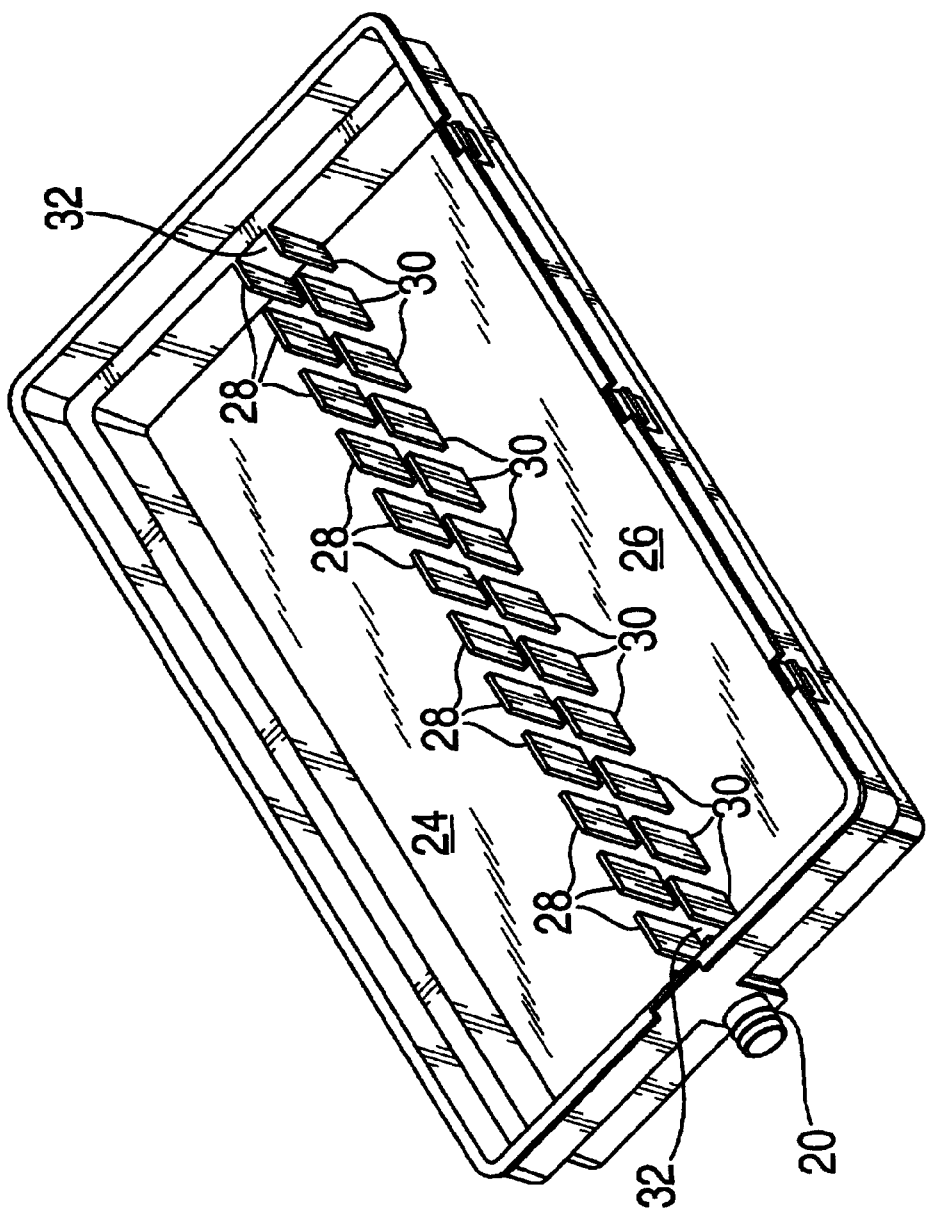
FIG. 2 is a perspective view of the combined filter and skimmer apparatus with the lid removed.

The filter media 14 is located in two sections 24, 26 (FIG. 2) of the box 12 defined by two rows of baffles 28, 30 which are spaced apart to define a channel 32 between the two sections 24, 26. The water outlet 20 is preferably aligned with (substantially collinear with) the channel 32.

The lid 22 has a raised central portion 34(FIGS. 1, 3, and 4) wherein lies the water inlet 16. The water inlet 16 is preferably adjustable as to the size of the inlet. More particularly, as shown in FIGS. 5A–5C and 6, the water inlet 16 includes a rotatable disk 19 having a handle 21. The disk 19 has a plurality of windows 16' and the cover 22 has a corresponding plurality of windows 17. The disk 19 is rotatable from a position wherein the windows 16' overlie the windows 17 to a position where the windows 17 are occluded. Adjusting the disk 19 will vary the amount of suction applied to the skimmer versus the filter i.e., the greater the number of "open" windows, the less amount of water drawn from the skimmer.

Figure 3:
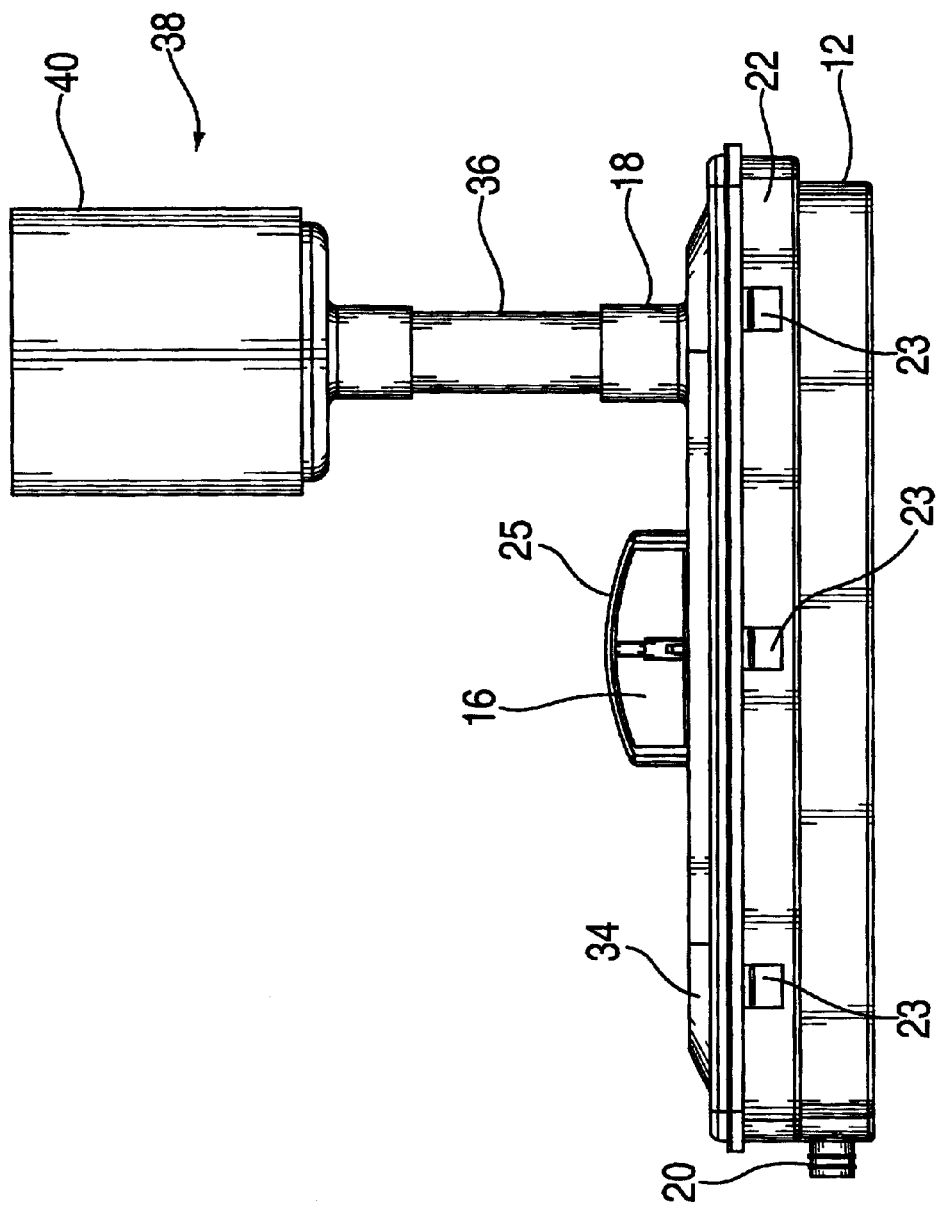
FIG. 3 is a side elevational view of the combined filter and skimmer apparatus.

According to the presently preferred embodiment, as shown in FIGS. 1, 3, and 4, the lid 22 is provided with a centrally located handle 25 by which the entire assembly may be lowered into and raised out of a pond (not shown).

As seen in FIGS. 1, 3, and 4A, the skimmer coupling 18 is also located in the raised portion 34 of the lid 22 and is spaced apart from the water inlet 16. According to the presently preferred embodiment, the skimmer coupling 18 is coupled to an upstanding conduit 36, the end of which is coupled to a skimmer head 38. The skimmer head 38 preferably includes a floating cup 40 which, as shown in FIG. 4B, automatically adjusts to the level of the surface of the pond such that the top wall 41 thereof is located at or just below the waterline 49 of pond 50. Optionally, the floating cup 40 is free to tilt to adjust for an angular difference between the surface of the lid 22 and the surface of the pond (not shown).

As seen best in FIGS. 4A–4C, the floating cup 40 comprises an inverted U-shaped, double walled cylindrical sidewall composed of a top wall 41 joined, at its outer end, to a downward depending solid outer wall 42 and, at its inner end, to a downwardly depending slotted inner wall 43 having slots 45 which merges with a generally horizontally-extending base wall 48. The inverted double-walled sidewall of floating cup 40 straddles the rim and/or side wall of a stationary, upstanding U-shaped cup 46 so that the floating cup 40 may move relative to fixed cup 46 while remaining in fluid connection and so that pond water may flow over top wall 41 into floating cup 40 through its slotted inner wall 43 into stationary cup 44 and, via conduit 36 and skimmer coupling 18, into filter box 12 (see arrows).

Cup 40 may be provided with a floatation material such as styrofoam (not shown), or preferably, may be floated via an air pocket trapped in the inverted U-shaped sidewall of floating cup 40 in the area adjacent top wall 41; the upper ends of slots 45 of inner sidewall 43 are spaced downwardly from top wall 41 so as to define an annular chamber 47 between the outer wall 42 and inner wall 43 and between top wall 41 and the upper end of slots 45 were air can be trapped. As a result, the floating cup 40 floats such that its top wall 47 is slightly above or at the water line 49 of the pond 50 (FIG. 4B).

Upon operation of the pump (not shown), water will be drawn from the skimmer head 38, through skimmer pond conduit 18 and into filter box 12. Due to the pump operation, the normally floating cup 40 will be drawn via suction downwardly such that its top end 41 rests against the rim of stationary cup 46 (FIG. 4C). As a result, top wall 47 of floating cup 40 is drawn below the water line 49 of pond 50, thereby allowing water at the water line 49 to flow into cup 40. However, upon turning the pump off, cup 40 will assume its normal floating position due to the air trapped in annular chamber 47 beneath top wall 41 (FIG. 4B). As can be appreciated, the floating cup can also tilt to assume a level position with the pond surface 49 in the case the filter box is not perfectly horizontal when positioned on the floor of the pond 50.

The presently preferred embodiment of the invention utilizes two replaceable "Bio-Matrix" cartridges (14 in FIG. 4A), each of which provides triple filtration for aquarium water. A dense white polyester filter media gives effective mechanical filtration while an activated carbon-impregnated polyester filter adds chemical filtration. A presently preferred embodiment suitable for ponds up to 3,000 gallons when used with an 1,800 GPH pump, has a 12"×24" filter box and has a 1" O.D. water outlet. The conduit 36 (FIGS. 1, 3, and 4A) may be supplied in different lengths depending on the depth of the pond. According to the presently preferred embodiment, the filter and skimmer of the invention is intended for ponds having a depth of 18 to 36 inches.

There have been described and illustrated herein several embodiments of a combination filter and skimmer for a pond. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as so claimed.

What is claimed is:

1. A combined filter and skimmer assembly for a pond, comprising:
    a) a filter box for containing a filter medium, said filter box comprising a removable lid, a skimmer coupling located on said removable lid, and a water outlet;
    b) a water conduit coupled to said skimmer coupling; and
    c) a skimmer head coupled to said water conduit, said skimmer head having a floating skimmer cup.

2. A combined filter and skimmer assembly according to claim 1, further comprising:
    d) removable filter media contained in said filter box.

3. A combined filter and skimmer assembly according to claim 1, wherein:
    said removable lid has a raised central portion and said skimmer coupling is located on said raised central portion.

4. A combined filter and skimmer assembly according to claim 1, wherein:

said filter box has two sections defined by a plurality of spaced apart baffles.

5. A combined filter and skimmer assembly according to claim 4, wherein:
said plurality of spaced apart baffles define a channel.

6. A combined filter and skimmer assembly according to claim 5, wherein
said water outlet is substantially collinear with said channel.

7. A combined filter and skimmer assembly according to claim 1, wherein:
said removable lid has a centrally located handle.

8. A combined filter and skimmer assembly according to claim 7, wherein:
said removable lid has an adjustable water inlet adjacent to said handle.

9. A combined filter and skimmer assembly according to claim 1, wherein;
said skimmer head comprises a stationary cup having a sidewall and an open top and bottom end, wherein said bottom end is fluidly coupled to said water conduit, and wherein said floating skimmer cup has an inverted doubled-walled sidewall which straddles at least a portion of said sidewall of said stationary cup.

10. A combined filter and skimmer assembly according to claim 9, wherein:
said floating skimmer cup has a top wall, a downwardly depending outer sidewall joined to the outer end of said top wall and a downwardly depending inner slotted sidewall joined to said inner end of said top wall.

11. A combined filter and skimmer assembly according to claim 10, wherein said slotted inner sidewall has slots spaced beneath said top wall so as to define an annular chamber beneath said top wall in which air may be trapped.

12. A combined filter and skimmer assembly for a pond, comprising:
a) a filter box for containing a filter medium, said filter box comprising a removable lid, a skimmer coupling located on said removable lid, an adjustable water inlet, and a water outlet;
b) a water conduit coupled to said skimmer coupling; and
c) a skimmer head coupled to said water conduit.

13. A combined filter and skimmer assembly according to claim 12, further comprising:
d) removable filter media contained in said filter box.

14. A combined filter and skimmer assembly according to claim 12, wherein:
said removable lid has a raised central portion and said skimmer coupling is located on said raised central portion.

15. A combined filter and skimmer assembly according to claim 14, wherein:
said adjustable water inlet is located on said raised central portion.

16. A combined filter and skimmer assembly according to claim 12, wherein:
said filter box has two sections defined by a plurality of spaced apart baffles.

17. A combined filter and skimmer assembly according to claim 16, wherein:
said plurality of spaced apart baffles define a channel.

18. A combined filter and skimmer assembly according to claim 17, wherein:
said water outlet is substantially collinear with said channel.

19. A combined filter and skimmer assembly according to claim 12, wherein:
said removable lid has a centrally located handle.

20. A combined filter and skimmer assembly according to claim 12, wherein:
said skimmer head comprises a stationary cup having a sidewall and an open top and bottom end, wherein said bottom end is fluidly coupled to said water conduit, and wherein said floating skimmer cup has an inverted doubled-walled sidewall which straddles at least a portion of said sidewall of said stationary cup.

21. A combined filter and skimmer assembly according to claim 20, wherein:
said floating skimmer cup has a top wall, a downwardly depending outer sidewall joined to the outer end of said top wall and a downwardly depending inner slotted sidewall joined to said inner end of said top wall.

22. A combined filter and skimmer assembly according to claim 21, wherein said slotted inner sidewall has slots spaced beneath said top wall so as to define an annular chamber beneath said top wall in which air may be trapped.

23. A combined filter and skimmer assembly for a pond, comprising:
a) a filter box for containing a filter medium, said filter box comprising a removable lid having a centrally located handle and an adjustable water inlet adjacent to said handle, a skimmer coupling, and a water outlet;
b) a water conduit coupled to said skimmer coupling; and
c) a skimmer head coupled to said water conduit, and skimmer head having a floating skimmer cup.

24. A combined filter and skimmer assembly according to claim 23, further comprising:
d) removable filter media contained in said filter box.

25. A combined filter and skimmer assembly according to claim 23, wherein:
said removable lid has a raised central portion and said skimmer coupling is located on said raised central portion.

26. A combined filter and skimmer assembly according to claim 23, wherein:
said filter box has two sections defined by a plurality of spaced apart baffles.

27. A combined filter and skimmer assembly according to claim 26, wherein:
said plurality of spaced apart baffles define a channel.

28. A combined filter and skimmer assembly according to claim 27, wherein:
said water outlet is substantially collinear with said channel.

29. A combined filter and skimmer assembly according to claim 23, wherein:
said skimmer head comprises a stationary cup having a sidewall and an open top and bottom end, wherein said bottom end is fluidly coupled to said water conduit, and wherein said floating skimmer cup has an inverted doubled-walled sidewall which straddles at least a portion of said sidewall of said stationary cup.

30. A combined filter and skimmer assembly according to claim 29, wherein:
said floating skimmer cup has a top wall, a downwardly depending outer sidewall joined to the outer end of said top wall and a downwardly depending inner slotted sidewall joined to said inner end of said top wall.

31. A combined filter and skimmer assembly according to claim 30, wherein said slotted inner sidewall has slots spaced beneath said top wall so as to define an annular chamber beneath said top wall in which air may be trapped.

32. A combined filter and skimmer assembly for a pond, comprising:
   a) a filter box for containing a filter medium, said filter box having a removable lid with a raised central portion, a centrally located handle, a skimmer coupling located on said raised central portion, an adjustable water inlet located on said raised central portion, and a water outlet;
   b) a water conduit coupled to said skimmer coupling; and
   c) a skimmer head coupled to said water conduit.

33. A combined filter and skimmer assembly according to claim 32, further comprising:
   d) removable filter media contained in said filter box.

34. A combined filter and skimmer assembly according to claim 32, wherein:
   said filter box has two sections defined by a plurality of spaced apart baffles.

35. A combined filter and skimmer assembly according to claim 34, wherein:
   said plurality of spaced apart baffles define a channel.

36. A combined filter and skimmer assembly according to claim 35, wherein:
   said water outlet is substantially collinear with said channel.

37. A combined filter and skimmer assembly according to claim 32, wherein:
   said skimmer head comprises a stationary cup having a sidewall and an open top and bottom end, wherein said bottom end is fluidly coupled to said water conduit, and wherein said floating skimmer cup has an inverted doubled-walled sidewall which straddles at least a portion of said sidewall of said stationary cup.

38. A combined filter and skimmer assembly according to claim 37, wherein:
   said floating skimmer cup has a top wall, a downwardly depending outer sidewall joined to the outer end of said top wall and a downwardly depending inner slotted sidewall joined to said inner end of said top wall.

39. A combined filter and skimmer assembly according to claim 38, wherein said slotted inner sidewall has slots spaced beneath said top wall so as to define an annular chamber beneath said top wall in which air may be trapped.

* * * * *